Jan. 11, 1966  A. K. CHITAYAT  3,229,101
PHOTOSENSITIVE OPTICAL TRACKER FOR MOON OR SATELLITES
Filed July 19, 1961  5 Sheets-Sheet 1
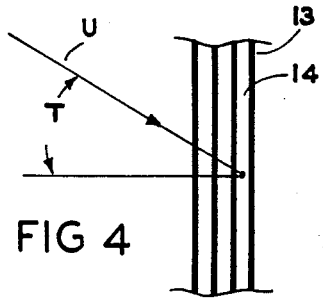
FIG 4
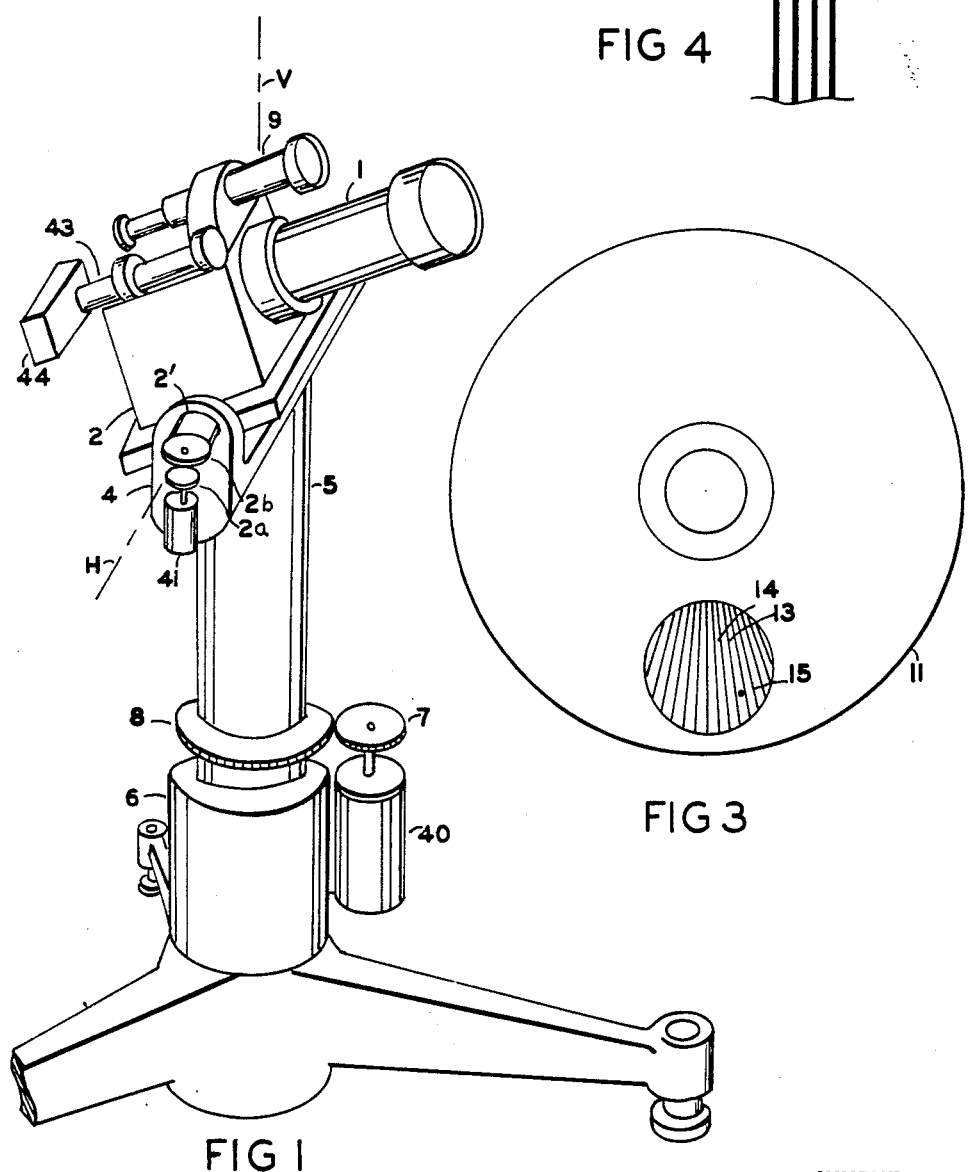
FIG 3
FIG 1
INVENTOR.
ANWAR K. CHITAYAT
BY

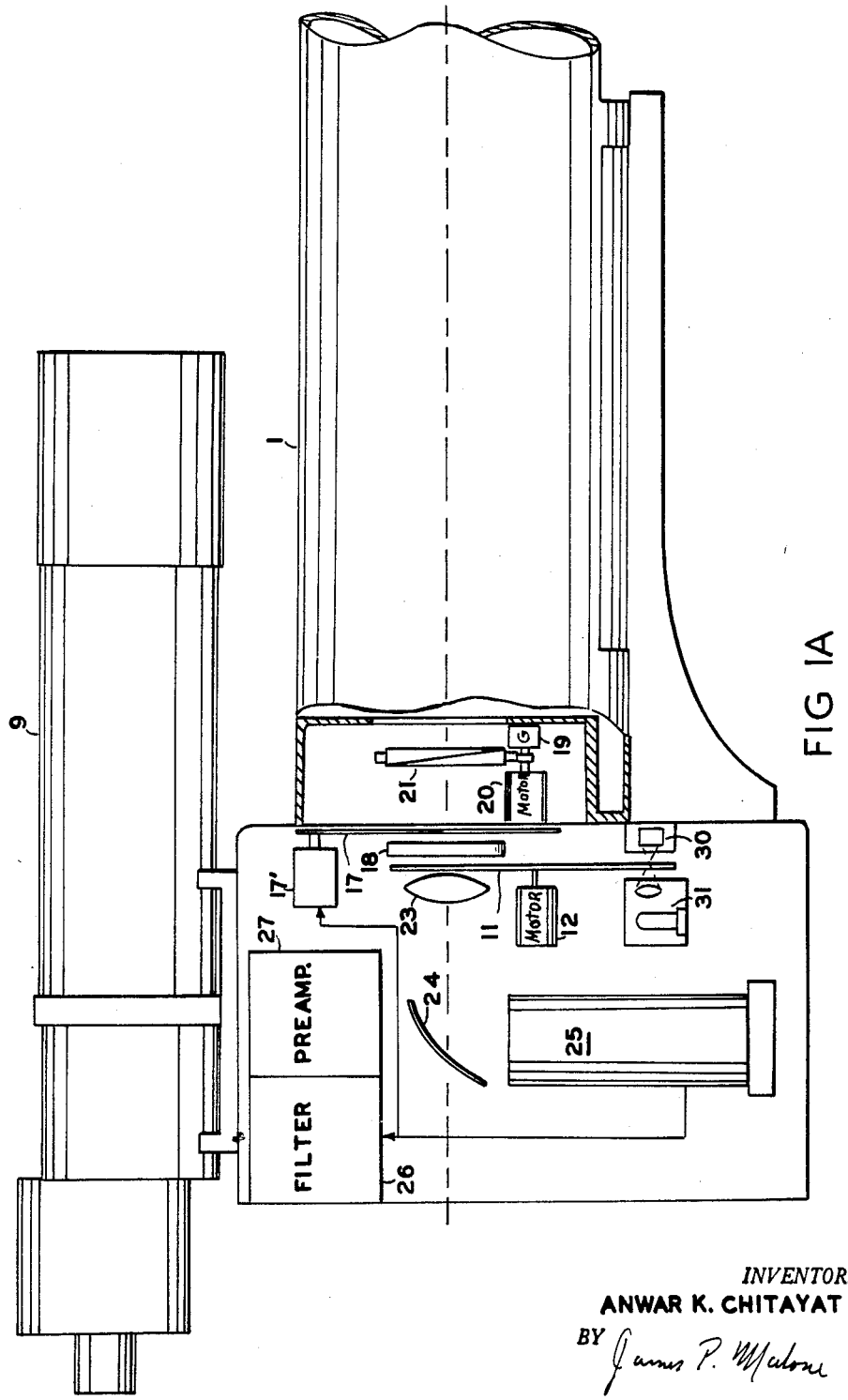

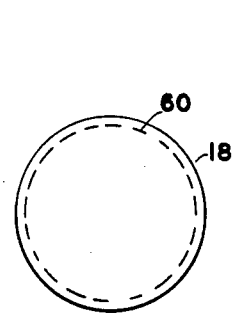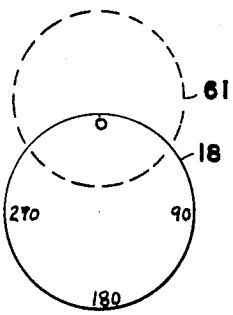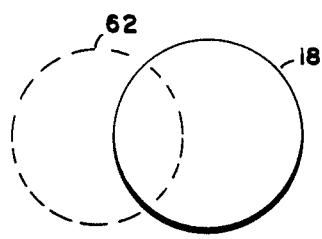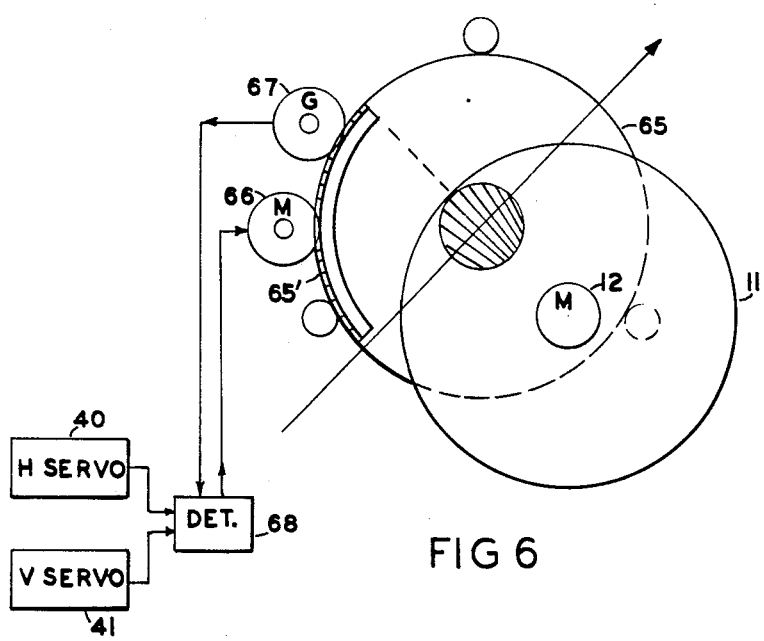

INVENTOR.
ANWAR K. CHITAYAT

United States Patent Office 3,229,101
Patented Jan. 11, 1966

3,229,101
PHOTOSENSITIVE OPTICAL TRACKER FOR
MOON OR SATELLITES
Anwar K. Chitayat, Plainview, N.Y., assignor to
Optomechanisms, Inc., Mineola, N.Y.
Filed July 19, 1961, Ser. No. 125,111
1 Claim. (Cl. 250—203)

This invention relates to optical tracking means for automatically tracking the moon or artificial satellites.

More particularly the present invention describes the design criteria and operation of a highly sensitive monitoring system for satellites. In addition it is used for tracking the center of the moon. The moon tracking capability is discussed in detail hereafter.

One of the features of the proposed invention is an optical-electronic scanning device used to distinguish the satellite from the noise due to stars and background. In this novel arrangement, the velocity of the satellite produces a signal which is unique and can be distinguished from all other noise sources. An extremely high overall signal to noise ratio is achieved in the system as a result of using high efficiency optics, low noise photomultiplier, low noise electronics, and optical scanning discriminators.

The output of the system is a signal whose amplitude is proportional to the reflected illumination of the satellite or moon. In addition, two separate D.C. voltages are provided to determine the error of tracking in two axes, for the correction of the servo-mechanisms of the mount. The moon tracking capability is achieved by placing a special aperture within the telescope, in addition to an electronic discriminating network. Better than two minutes of arc tracking accuracy of the moon is thus achieved.

Accordingly, the principal object of the invention is to provide new and improved optical tracking means.

Another object of the invention is to provide new and improved optical tracking means for tracking the moon or satellites.

Another object of the invention is to provide new and improved telescopic tracking means having means responsive to the velocity of a predetermined target to reject noise signals.

Another object of the invention is to provide new and improved optical tracking means comprising a telescope adapted to receive optical images from a moon or satellite, a rotating wedge behind said telescope adapted to nutate said image, phase reference means connected to said rotating wedge, and means to compare the phase position of said image with respect to said reference to determine angular error of the tracking, and means responsive to said comparing means to move said telescope to target said moon or satellite.

These and other objects of the invention will be apparent in the following specification and drawings of which:

FIG. 1 is a perspective view of an embodiment of the invention.

FIG. 1A is a detail view of the telescopic mount.

FIGS. 3 and 4 are detail views of the rotating raster.

FIGS. 5A, 5B, and 5C are diagrams illustrating the operation of the phase responsive tracking means.

FIG. 6 is a detail view of a modified rotating mechanism for raster alignment.

Figure 7:
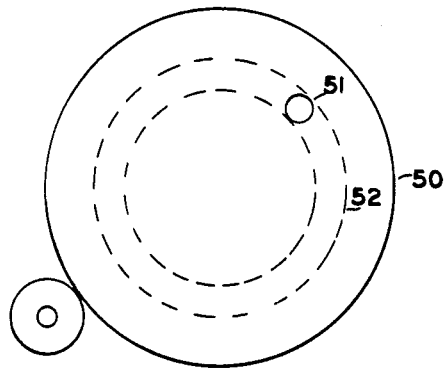

FIG. 7 is a detail view of the moon tracking scanning disc.

FIGS. 8A, 8B, 8C, 8D and 8E are diagrams illustrative of the operation of the moon scanning disc.

Referring to the figures, the invention generally comprises a telescope 1 mounted in a telescope mount 2. The mount 2 is mounted on yoke 4 for rotation about a horizontal axis H. The yoke 4 is mounted for rotation about the vertical axis V on the shaft mount 5, which is rotatably mounted in the mount socket 6.

The mount 2 is adapted to be rotated around the horizontal axis by means of the servomotor 41, mounted on yoke 4, which is connected to rotate the mount 2 on shaft 2' by means of gears 2a and 2b.

The mount 2 is adapted to be rotated about the vertical axis V by means of the servomotor 40 mounted on the base 6 by means of the gears 7 connected to the servomotor 40, which meshes with gear 8, which is fixedly connected to the shaft 5. A visual spotting telescope 9 is provided for initial setups preferably with conventional manual controls, not shown.

Another telescope 43 is preferably provided for camera 44 or other auxiliary equipment.

FIG. 1A illustrates the optical schematic of the telescope 2 subsystem. The telescope 1 collects the light illumination from the sky, focusing it in the plane of the rotating raster 11.

The rotating raster disc 11 (see FIG. 3) is driven by a synchronous motor 12 through a gear reducer. The raster disc 11, shown in FIG. 3, contains black and transparent lines 13, 14, etc. equally spaced throughout the raster. The satellite's image 15 appears as approximately a point on the raster. The constant rotation of the raster line causes a modulation of the illumination of the point image with a constant carrier frequency ($f_0$).

Each cycle of modulation (one dark and transparent line) is equivalent to approximately ½ minute of arc. Consequently, if the image of the satellite is moving relative to the raster lines, the actual modulation due to motion is $f_0+f_v$, where $f_v$ is the shift of frequency due to the motion of the image.

In addition to the rotating raster 11 used for noise rejection, a synchronous motor 20 drives a rotating wedge 21 which tilts and rotates the image in order to determine the phase position of the satellite relative to the optical axis. This wedge 21, or semicircular disc or other equivalent, rotates at a frequency determined by the synchronous motor 20 and associated gear train. A permanent magnet generator 19 is connected to this drive in order to provide a phase reference signal.

An interchangeable aperture 18, is preferably placed near the focal plane, decreases the field of view of the system to that desired by the operator.

A collecting lens 23 and mirror 24 are placed between the focal plane of the telescope and the photomultiplier tube 25. These optics gather the light rays from any point within a maximum of the edges of the field of view and collect them on the photosensitive cathode of phototube 25. The light rays arising from a point source (such as a satellite) are preferably defocused when they arrive at the cathode, in order to minimize the variation of the output due to the varying sensitivity of the photocathode of tube 25.

A shutter 17 is provided to protect tube 25 from bright light such as direct sunlight. The shutter is operated by solenoid control means 17' in response to the output of tube 25.

Figure 2:
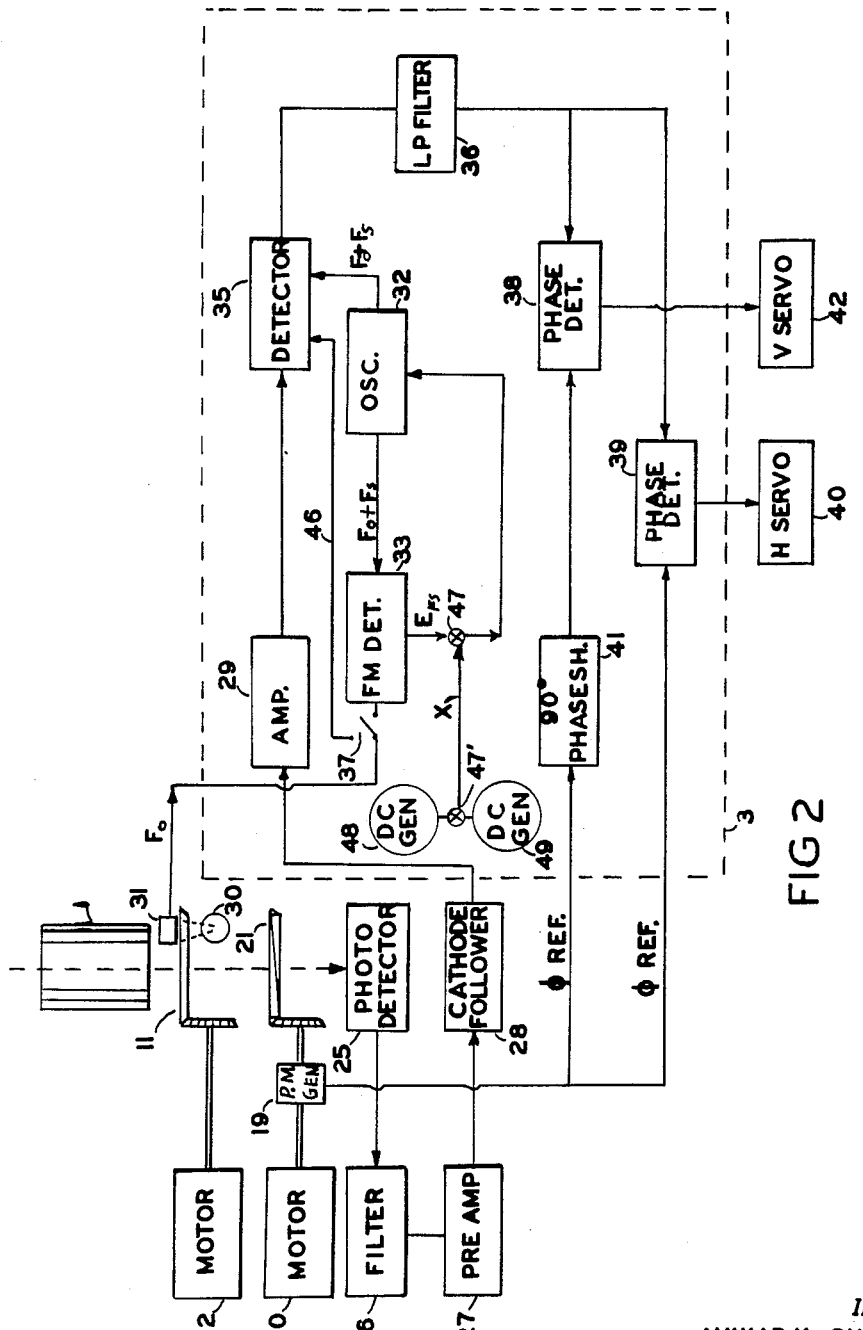
FIG. 2 is a schematic block diagram circuit.

FIG. 2 illustrates the schematic block diagram of the system. Signals received by the telescope 1 pass through the rotating raster 11 and the rotating wedge 21 to the photodetector 25, then through filter 26, amplifier 27, cathode follower 28, and amplifier 29 to detector 35, where they are compared with signals from the phototube 31 having a frequency $f_0$, namely, the raster frequency. The detector 35 rejects signals which are not of the frequency $f_0$. The output of the detector 35 passes through a filter 36 to phase detectors 38 and 39. The phase references for the phase detectors 38 and 39 are derived from the permanent magnet generator 19, which is synchronized with the rotating wedge 21. The outputs of the phase detectors 39 and 38 are fed to the servomotors 40 and 42 respectively.

More specifically the signal received by the photomultiplier 25 is filtered first by a bandpass filter 26, in order to reject the majority of extraneous noise components, such as 60 c.p.s. pickup. The signal is then amplified by a two stage amplifier 27 and connected to a cathode follower 28. The output of the telescope subsystem 2 is therefore of low impedance, reducing noise and pick-up signals and allowing the use of a long cable connecting the telescope subsystem to the electronic control box 3.

The wedge 21 with its corresponding synchronous motor 20 tilts and rotates, or nutates the image of the satellite. The angular phase of the signal determines whether the satellite is at the left, right, or up or down, as shown in FIG. 5.

FIGS. 5, 5A, 5B and 5C illustrate the operation of the optical wedge 21.

FIG. 5A shows the path of rotation of the satellite image 60 with respect to the optical aperture 18 when the optical axis of the telescope is centered on the satellite.

FIG. 5B shows the path of rotation of satellite image 61 when the image is above the optical aperture 18.

FIG. 5C shows a satellite image 62 which is to the left of the optical axis of the aperture 18.

In operation, as the wedge 21 tilts and rotates the image when the satellite is above the optical axis, the received signals will have a certain phase relation to the rotation of the wedge, for instance zero degrees. When the satellite is to the right of the optical axis the phase relation will be 90°, when the satellite is below the optical axis, the phase relation will be 180°, etc.

Referring again to FIG. 2 a permanent magnet generator 19 geared to the wedge 21 provides a phase reference. Its output is then compared to the signal in conventional phase detector 39. If an error exists in the horizontal axis H, then an output error signal is developed in order to drive the servoamplifier 40 in that axis. Similarly, a reference signal phase shifted by conventional 90° phase shifter 41 is compared to the signal in phase detector 38 to determine the error in the second or vertical axis V, which is fed to V servo 42. The direction of the error is determined by the polarity of the output voltage (positive or negative).

The motor 12, driving the raster 11 and its housing, may be mounted to be rotated around the optical axis by 90°, through a drive motor as shown in FIG. 6. This allows the raster lines to be placed perpendicular to the motion of the mount for greatest accuracy of measurement, independent of the orientation of the telescope. The mount motion is shown by an arrow.

FIG. 6 shows means for mounting the rotating raster so that the motion of the telescope mount is perpendicular the raster lines. This may be done by mounting the motor 12 and the raster 11 on a rotating plate 65 which is mounted to rotate about the optical axis by means of the drive motor 66, the output of which is geared to ring gear 65' which extends around 90° or ¼ of the periphery of the plate 65. The angular position of the plate 65 is transmitted by the synchro-generator 67 to the detector 68 which is connected to drive the servomotor 66.

The direction of the mount motion is fed to detector 68 from horizontal and vertical servo means 40 and 41.

It is noted that if there is no motion of the satellite relative to the optical axis of the telescope, then the satellite image is modulated due to the rotation of the raster at a frequency ($f_0$). However, if the tracking system is locked on the satellite, then any image of a star picked up is made to move relative to the optical axis. This motion would then cause a shift of the star's image across the raster lines by a frequency of $f_v$. This frequency is then added to the main carrier frequency of the raster $f_0$. Thus, the resultant frequency of modulation is $f_0+f_v$. It may be noted here that there terms ($f_0$, $f_v$) are added algebraically since they may be subtracted instead of added together, if the satellite is in the opposite direction.

FIG. 4 shows the mathematical derivation of $f_v$; where, U represents the image travel in minutes of arc per second at an angle T relative to the raster lines 13, then $f_v=2U \cos T$.

The term 2 is contained since one cycle is equal to ½ minute of arc, due to the physical spacing of the raster lines. Thus, if the system tracks a satellite whose velocity is 50 minutes of arc per second, then $f_v=100$ c.p.s.

The raster rotation frequency ($f_0$) may be set at 300 c.p.s. Therefore, during tracking, the target satellite's frequency is 300 c.p.s., while a star's frequency which may be received is for instance 200 c.p.s. Electronically, it is relatively easy to distinguish the two signals.

The system described above is simple when continuously tracking. However, during the original phases where the satellite is not yet tracked precisely, a relative motion exists between the satellite and the optical axis of the telescope. In order to acquire and lock on to the target image, the switch 37 is connected to detector 33. Then the modulation frequency of the satellite is $f_0+f_s$. This velocity ($f_s$) is represented by an input voltage "X," which is the anticipated relative motion. A D.C. generator 49 or equivalent voltage source is provided on the tracking mount. Then if the anticipated angular velocity of the satellite from D.C. generator 48 is subtracted from the mount velocity $fm$ in difference circuit 47', the approximate satellite's velocity relative to the mount $f_s$ is represented by the input voltage X.

The raster 11 frequency ($f_0$) is measured by a light source 30 and phototransistor 31 as shown in FIG. 1. The output of the transistor 31 is a square wave signal whose frequency $f_0$ is determined by the raster rotation. This output is then compared in $fm$ detector 33 to that of an oscillator 32 whose desired output is $f_0+f_s$. The $fm$ detector 33 produces a voltage $E_{fs}$ whose amplitude is proportional to the difference of the two inputs which are: ($f_0$) and ($f_0+f_s$). This voltage is then made to be equal to voltage X, which is the desired $f_s$ by taking any difference in difference means 47 and applying the difference to the frequency controlled oscillator 32 which is made to change in frequency until its output equals $f_0+f_s$.

A demodulator or detector 35 is used to compare the signal obtained from the photomultiplier 25 with the computed satellite frequency. If these correspond, then an output is developed which is then integrated by a low pass filter 36. However, all star signals contain signals other than $f_0+f_s$, and will not be passed by the demodulator 35.

During normal tracking switch 37 is switched and the output $f_0$ is directly fed by connection 46 to the demodulator 35, by passing the oscillator 32 and detector 33.

*Moon tracking capability*

This system can be used for tracking the moon by making a simple change:

The optical wedge 21 is removed from its rotating holder and is replaced by an opaque disc 50 (FIG. 7) having an aperture 51 near the periphery. The aperture rotates as shown in FIG. 7, and the image of the full moon is adjusted by moving the telescope so that it lies within the rotating circle 52 of the aperture. FIGS. 8A–8E illustrate the relationship of the image of the moon, being swept by the rotating aperture 51. The moon M is shown as a quarter illuminated. Error signals produced by aperture 51, FIGS. 8A, 8B, 8C and 8D are shown as double cross hatched areas with the moon in different phase positions in order to drive the moon image so that its center is on the telescope's optical axis. The arrows show the direction the image must be driven to center the moon image. FIG. 8E shows the moon when it is properly centered within the field of view, where no error signals are produced.

The operation of the moon tracking capability is illustrated in FIGS. 7 and 8. The disc 50 rotates by means of a synchronous motor 20 in the same manner as when the wedge 21 is used for tracking error detection. The moon area intercepted by the aperture 51 is illustrated by the double crosshatched area M.

The permanent magnet generator 19 establishes a phase reference signal. The aperture 51 in the disc causes the moonlight passing to the photodetector 25 to vary in phase according to the position of the image relative to the optical axis.

Figure 8A:
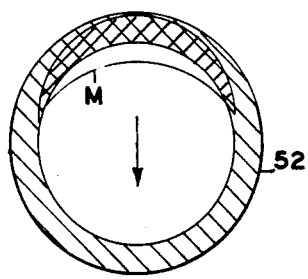
Figure 8B:
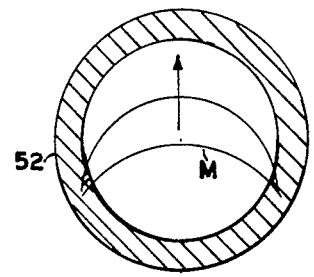
Figure 8C:
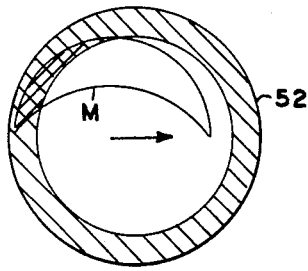
Figure 8D:
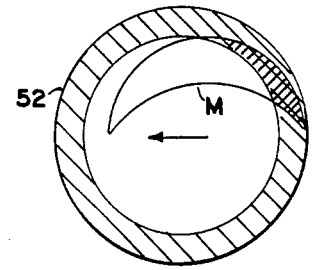
Figure 8E:
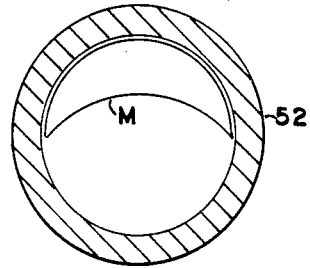

If the image is too high, FIG. 8A, too low, FIG. 8B, or to the right, FIG. 8D, or left, FIG. 8C, the proper phase signals are produced, and corrective action by the servo drives is initiated. This action is independent on whether the moon is fully or partially illuminated.

The rotating raster does not enter into the moon tracking function and is left as a passive component. It may be added that the intense illumination of the moon (compared to that of satellites) allows a high accuracy of tracking independent of the high levels of illumination in the daytime. Consequently, day and night moon operation is assured.

The extraneous effects of stars are minimized or eliminated by the rotating raster 11, and phase comparison techniques utilizing the velocity of satellites as a reference. In addition, the sky background including the brightness gradients has been minimized by the presence of the rotating raster and electronic demodulator, thus allowing only these signals due to point sources. Consequently, the major contributing factor is shot noise of the photomultiplier due to sky and dark currents.

Therefore, the present invention achieves high sensitivity of satellite tracking within low size, weight, and cost. Its design flexibility, in addition to having the integrating photometric capability of sky and satellites, makes it unique and versatile. Thus, by merely interchanging a telescope of larger aperture, higher sensitivities are achieved. Furthermore, IR detection can be achieved by merely changing the photomultiplier in use. Manual, automatic, or scanning capabilities are included.

Many modifications may be made by those who desire to practice the invention without departing from the scope thereof which is defined by the following claim:

I claim:

Means for optically tracking the moon comprising a telescope movably mounted to receive an image from the moon, an opaque disc rotatably mounted behind said telescope, said disc having a round aperture adjacent the periphery thereof, means to rotate said disc so said aperture scans a circle and passes signals in phase relation to the deviation of the moon from the optical axis of said telescope, phase reference means connected to said disc means including photo detector means to compare the phase position of said moon with said phase reference means, servo motor means responsive to said phase comparing means to move said telescope to track said moon, and noise discriminating means comprising a rotating raster mounted behind said telescope, means to rotate said raster to modulate signals from said telescope, means to mount said raster so that said raster lines are perpendicular to the direction of movement of said moon comprising a rotatable plate mounting said raster and means to control the position of said plate, said raster being mounted eccentrically on said rotatable plate.

References Cited by the Examiner

UNITED STATES PATENTS

| | | | |
|---|---|---|---|
| 2,425,541 | 8/1947 | Konet | 250—203 X |
| 2,941,080 | 6/1960 | Hansen | 250—203 |
| 2,942,118 | 6/1960 | Gedance | 250—203 |
| 2,943,204 | 6/1960 | Greenlee et al. | 250—203 |
| 2,949,672 | 8/1960 | Ostergren | 250—203 X |
| 2,956,170 | 10/1960 | Sibley | 250—203 |
| 2,967,247 | 1/1961 | Turck | 250—203 |
| 2,975,289 | 3/1961 | Robert et al. | 250—203 |
| 2,981,842 | 4/1961 | Kaufold et al. | 250—83.3 |
| 2,981,843 | 4/1961 | Hansen | 250—203 |
| 3,002,096 | 9/1961 | Eckweiler et al. | 250—203 |
| 3,002,098 | 9/1961 | Watkins | 250—203 |
| 3,024,699 | 3/1962 | Chitayat | 250—203 X |
| 3,061,730 | 10/1962 | Jankowitz | 250—203 |

RALPH G. NILSON, *Primary Examiner.*

ARCHIE BORCHELT, *Examiner.*